(12) United States Patent
Fukushima et al.

(10) Patent No.: US 7,015,778 B2
(45) Date of Patent: Mar. 21, 2006

(54) ACTUATOR DEVICE

(75) Inventors: Toshiaki Fukushima, Tokorozawa (JP); Kazuo Suzuki, Kamifukuoka (JP); Takahiro Kawada, Higashimurayama (JP); Shigeru Futakami, Tokorozawa (JP); Takashi Abe, Tokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 48 days.

(21) Appl. No.: 10/653,155

(22) Filed: Sep. 3, 2003

(65) Prior Publication Data

US 2004/0046625 A1  Mar. 11, 2004

(30) Foreign Application Priority Data

Sep. 5, 2002 (JP) ............................. 2002-259486
Mar. 27, 2003 (JP) ............................. 2003-086847

(51) Int. Cl.
*H01H 51/22* (2006.01)
(52) U.S. Cl. ......................................... 335/78; 335/128
(58) Field of Classification Search ............ 335/78–80, 335/124, 128
See application file for complete search history.

(56) References Cited

U.S. PATENT DOCUMENTS

| | | | | |
|---|---|---|---|---|
| 3,621,419 A | * | 11/1971 | Adams et al. | 335/230 |
| 3,968,470 A | * | 7/1976 | Brown | 335/230 |
| 4,092,620 A | * | 5/1978 | Schuessler et al. | 335/128 |
| 4,703,293 A | * | 10/1987 | Ono et al. | 335/80 |

FOREIGN PATENT DOCUMENTS

JP  2001-075026  3/2001

* cited by examiner

*Primary Examiner*—Elvin G. Enad
*Assistant Examiner*—Bernard Rojas
(74) *Attorney, Agent, or Firm*—Smith, Gambrell & Russell, LLP

(57) ABSTRACT

The actuator device includes a rotation body and a rotation restriction plate. The rotation axis of the rotation body is placed on the rotation axis holding member. The rotation restriction plate is placed on the side opposite the rotation axis holding member with respect to the rotation axis of the rotation body. As a result, when the drive means is operated to move the rotation body thereby causing the abutment of the rotation body and the rotation restriction plate, the rotation axis of the rotation body is always subjected to a force which presses it against the rotation axis holding member, and there is no force which urges the rotation body to be floated up from the rotation axis holding member.

6 Claims, 15 Drawing Sheets

ACTUATOR DEVICE

BACKGROUND OF INVENTION

1. Field of the Invention

The present invention relates to an actuator device comprising a rotation body having a rotation axis and drive means for changing the posture (position) of the rotation body and holding it at the changed position.

2. Description of the Related Art

In recent years, for the application to optical switch devices and the like in optical transmission systems such as an optical LAN in particular, an actuator device which can provide a high precision displacement at a high speed is desired. To apply such an actuator device to an optical switch, the device is required to have a moving velocity of ten and some m/s and a mirror positioning accuracy of about plus or minus 1 μm, and various methods have been proposed. Among those methods, since mechanical optical switches can directly change the propagation direction of light by mechanically driving a fiber or a mirror (or a shield plate), they have advantages in that the light loss and crosstalk inside a switch is smaller than those of optical switches of other methods, and are being put into practical uses as the most promising technique which can be applied to optical switches.

As the mechanical optical switch technology including an optical switch part and an actuator part, which is a prior art in that technical field, a mirror-drive mechanical 2×2 optical switch has been disclosed (see, for example, Japanese Patent Application Laid-Open No. 2001-75026 (FIG. 6 in pages 9 to 10)). Further, there is an actuator device which is applicable to mechanical optical switches as an example of other prior arts, which can be used as a 2×2 optical switch and in which the optical switch part has a common configuration and only the actuator part has a different configuration. This prior art will be described in detail referring to FIG. 11.

First, the optical fiber part 3 constituting an optical switch will be explained. This optical fiber part 3 comprises a first collimator lens assembly 105 in which a pair of optical fibers 101, 103 are placed in symmetry of the optical axis of the lens, and s second collimator lens assembly 111 in which a pair of optical fibers 107, 109 are placed, and the first and second collimator assemblies 105, 111 are oppositely placed to align the optical axes. In this configuration, the first and second collimator lens assemblies 105, 111 are supported in a manner such that the optical fiber 101 and the optical fiber 109, and the optical fiber 103 and the optical fiber 107 are optically connected crossing with each other.

Next, an actuator part 5 will be described. The actuator part 5 is placed in a housing 1 of any size, and the rotation axis 15 is rotatably supported by the rotation axis holding member 43 which are provided on the bottom face 41 of the housing 1 by being held between the pair of the rotation axis holding members 43 and the axis pressing spring 13 fixed to the housing 1. Moreover, the rotation axis 15 is held in the thrust direction with its one end abutting against the block 47 and with the other end being applied a fixed pressure by a thrust spring 49. There are fixedly inserted a rotor magnet 17 and a mount part 45 in the middle part of the rotation axis 15. These rotation axis 15, the rotor magnet 17 and the mount part 45 constitute a rotation body 7.

This actuator part 5 includes a first yoke 23 and a second yoke 27 which are made of a magnetic material such as electromagnetic soft iron. The first yoke 23 is magnetically coupled by combining a plurality of parts, and can self-hold the rotation body 7 at a first rotation position to be described later with a holding force which is a magnetic attraction force by which the rotor magnet 17 is attracted to the first yoke 23. In a like manner, the second yoke is magnetically coupled by combining a plurality of parts and can self-hold the rotation body 7 at a second rotation position to be described later with a holding force which is a magnetic attraction force by which the rotor magnet 17 is attracted to the second yoke 27.

The first yoke 23 is wound with a fist exciting coil 25 to form a fist magnetic circuit 9. This first magnetic circuit 9 moves the rotation body 7, which is in a self-holding state at the first rotation position, to the second rotation position by generating an enough rotational force to move the rotation body 7 from the first rotation position to the second rotation position to be described later.

The second yoke 27 is wound with a second exciting coil 29 to form a second magnetic circuit 11. This second magnetic circuit 11 moves the rotation body 7, which is in a self-holding state at the second position, to the first rotation position by generating an enough rotational force to move the rotation body 7 from the second rotation position to be described later to the first rotation position.

The first magnetic circuit part 9 and the second magnetic circuit part 11 are fixed to the housing 1 with screws (not shown) or the like. The terminal of the first exciting coil 25 and the terminal of the second exciting coil 29 are connected to a terminal pin (not shown) or FPC (flexible printed circuit) (not shown), and are taken out of the housing 1 to provide an electrical connection to the outside thereby controlling the actuator device.

Next, the rotation body 7 will be described referring to FIG. 12. The rotation body 7 is configured such that a rotor magnet (not shown) and a mount part 45 are fixed to the rotation axis 15 by means of adhesion or press fitting. The rotation body 7 is rotatably supported by a rotation axis holding member 43 provided on the bottom face 41 of the housing 1 by being held between the two rotation axis holding members 43 and the axis pressing spring (not shown) fixed to the housing 1. Moreover, a first rotation restriction part 57 and a second rotation restriction part 59 are provided on the bottom face 41 of the housing at a position spaced apart from the center of the rotation axis.

Next, the rotation restriction structure of the actuator part 5 will be described.

The state in which the rotation body 7 including the rotor magnet 17 is self-held at the first rotation position will be described referring to FIG. 13A. It is supposed here that the rotor magnet 17 is polarized into two poles in the direction shown in the figure. In FIG. 13A, reference numeral 21 denotes a reflection mirror surface provided in the rotation body 7 and reference numeral 35 denotes an optical path.

As shown in FIG. 13A, one end 31 of the first yoke 23 is located near the N pole of the rotor magnet 17, and the other end 33 is located near the S pole of the rotor magnet 17. The rotation axis 15 is rotatably supported by the rotation axis holding member 43 provided on the bottom face 41 of the housing 1, and is pressed down by an axis pressing spring 13 from above. Moreover, there is arranged a first rotation restriction part 57 on the bottom face of the housing 1 at a position which allows the contact with the first abutment part 53 of the mount part 45 constituting the rotation body 7.

Next, the magnetic circuit in a state in which the rotation body 7 is self-held at the first position will be described referring to FIG. 13B. The magnetic flux, which has been generated at the N pole of the rotor magnet 17, flows through the gap to one end 31 of the first yoke 23 which is the magnetic material located at a closest position, and flows through the first yoke 23 to the other end 33 of the first yoke 23, and further flows from the other end 33 of the first yoke 23 to the S pole of the rotor magnet 17 through the gap.

A closed magnetic circuit is formed by the flow of the magnetic flux as shown in FIG. 13B, and a magnetic attraction force is generated between the rotor magnet 17 and the first yoke 23, thereby the rotation body 7 being self-held at the first rotation position. The state in which the rotation body 7 is self-held at the first rotation position enables to hold a state in which the light on the optical path 35 passing through the optical fiber is reflected by the reflection mirror surface 21.

Next, the state in which the rotation body 7 is self-held in the second rotation position will be described referring to FIG. 14A.

One end 37 of the second yoke 27 is located near the rotor magnet 17, and the other end 39 is located near the S pole of the rotor magnet 17. Moreover, on the bottom face 41 of the housing 1, a second rotation restriction part 59 is arranged at a position which allows the contact with the second abutment part 55 of the mount part 45 constituting the rotational body 7.

Next, the magnetic circuit when the rotation body 7 is self-held at the second rotation position will be explained referring to FIG. 14B. The magnetic flux, which has been generated at the N pole of the rotor magnet 17, flows through the gap to one end 37 of the second yoke 27 which is the magnetic material located at a closest position, and flows through the second yoke 27 to the other end 39 of the second yoke 27, and further flows from the other end 39 of the second yoke 27 to the S pole of the rotor magnet 17 through the gap.

A closed magnetic circuit is formed by the flow of the magnetic flux as shown in FIG. 14B, and a magnetic attraction force is generated between the rotor magnet 17 and the second yoke 27, thereby the rotation body 7 being self-held at the second rotation position. The state in which the rotation body 7 is self-held at the second rotation position enables to hold a state in which the light on the optical path 35 passing through the optical fiber is allowed to pass through.

However, the above described prior art still has the following problem. That is, when the rotation body 7 is moved from the first rotation position to the second rotation position, or from the second rotation position to the first rotation position, and a collision occurs between the first rotation restriction part 57 and the first abutment part 53, or between the second rotation restriction part 59 and the second abutment part 55, the force acting on the rotation body 7 tends to urge the rotation axis 15 in the direction to be floated up from the rotation axis holding member 43.

Now, the force which acts on the rotation body 7 when the rotation body 7 has been moved from the first rotation position to the second rotation position will be described referring to FIG. 15A and FIG. 15B.

Provided that the rotor magnet 17 constituting the rotation body 7 is polarized into N and S poles as shown in FIG. 15A, a current is applied to the first exciting coil 25 to generate a magnetic flux φ to polarize the one end 31 of the first yoke 23 into a N pole thereby generating a repulsive force FN between the N pole of the rotor magnet 17 and the one end 31 of the first yoke 23, and also the other end 33 of the first yoke 23 is polarized into a S pole thereby generating a repulsive force FS between the S pole of the rotor magnet 17 and the other end 33 of the first yoke 23. These repulsive forces FN, FS will cause the rotation body 7 to rotate about the rotation axis 15 in the clockwise direction up to the second rotation position.

To secure the movement of the rotation body 7 from the first rotation position to the second rotation position, it is required to keep the first exciting coil 25 in an energized sate for a sufficiently long time. In this case, rotation of the rotation body 7 is restricted by the contact between the second abutment part 55 of the mount part 45 and the second rotation restriction part 59, and thereby the rotation body 7 is subjected to a moment pivoted at the contact part A. The acting moment in such a case will be described referring to FIG. 15B.

Letting the distance from the contact part A to the part on which a repulsive force FS acts be RS, and the distance from the contact part A to the part on which a repulsive force FN acts be RN, the torque T acting on the center of gravity of the rotation body 7 is given by the following equation with the clockwise direction being the plus direction as shown in FIG. 15B.

$T=FS \times RS - FN \times RN$

And if FS=FN (=Fm), the following condition holds:

$T=Fm(RS-RN)>0$

Thus, since the rotation body 7 is subjected to a rotational moment in the clockwise direction at the contact part A acting as a supporting point, the rotation body 7 is exerted by a force to push up the axis pressing spring 13 (i.e., to be floated up from the rotation axis holding member 43).

Next, the force which acts on the rotation body 7 when it has been moved from the second rotation position to the first rotation position will be described referring to FIG. 16A and FIG. 16B.

A current is applied to the second exciting coil 29 to generate a magnetic flux φ to polarize the one end 37 of the second yoke 27 into a N pole thereby generating a repulsive force FN between the N pole of the rotor magnet 17 and the one end 37 of the second yoke 27, and also the other end 39 of the second yoke 27 is polarized into a S pole thereby generating a repulsive force FS between the S pole of the rotor magnet 17 and the other end 39 of the second yoke 27. These repulsive forces FN, FS will cause the rotation body 7 to rotate about the rotation axis 15 in the counter-clockwise direction up to the first rotation position.

The torque T acting at that time on the center of gravity of the rotation body 7 is given by the following equation with the counter-clockwise direction being plus direction as shown in FIG. 16B.

$T=FN \times RN - FS \times RS$

And if F=FS (=Fm), the following condition holds:

$T=Fm(RN-RS)>0$

Thus, since the rotation body 7 is subjected to a rotational moment in the counter-clockwise direction at the contact part A acting as a supporting point, the rotation body 7 is exerted by a force to push up the axis pressing spring 13 (i.e., to be floated up from the rotation axis holding member 43).

As have been explained so far, in both cases in which the rotation body 7 moves from the second rotation position to the first rotation position, and from the first rotation position to the second rotation position, the rotation body 7 is exerted by a force to be floated up from the rotation axis holding member 43. Therefore, when the spring force of the axis pressing spring 13 is weak, the rotation axis 15 will be floated up and may be detached from the rotation axis holding member 43.

To avoid such a phenomenon, it is necessary to specify the spring force of the axis pressing spring to be strong enough to prevent the rotation axis 15 from being floated up. However, when the spring force of the axis pressing spring 13 is increased, the friction resistance of the slide parts between the rotation axis holding member 43 and the rotation axis 15 will be increased thereby requiring the application of a high voltage and therefore a large current to operate that. For this reason, it becomes difficult to achieve a low voltage drive and a low current consumption operation.

Moreover, since the friction resistance between the rotation axis holding member 43 and the rotation axis 15 becomes large, the amount of wear in the slide parts will inevitably increase thereby degrading the durability.

When a conventional actuator device is used for an optical switch, the slope of the rotation axis 15 will change due to the wear and that positional change will lead to a change in the inclination of the mirror surface. Thereby, the change in the amount of loss of light from its initial stage may increase thereby causing a problem in view of the reliability of the device.

SUMMARY OF THE INVENTION

The actuator according to the present invention comprises: a rotation body having a rotation axis; a rotation axis holding member which rotatably supports the rotation axis by bearing the rotation axis on a recess formed on its top face; a rotation restriction plate for restricting the rotation position of the rotation body; posture holding means for allowing a self-holding in a first posture in which one end of the rotation body is in abutment against one end of the rotation restriction plate, or in a second posture in which the other end of the rotation body is in abutment against the other end of the rotation restriction plate; and driving means for moving the rotation body from the first posture to the second posture, or from the second posture to the first posture. The rotation restriction plate is provided on the opposite side of the rotation axis holding member with respect to the rotation axis of the rotation body so that when one end or the other end of the rotation body is caused to abut against the one end or the other end of the rotation restriction plate, the rotation axis is exerted by a force in the direction of pressing it against the rotation axis holding member.

The actuator device according to the present invention can be provided with an optical switch function by oppositely placing a pair of optical fibers on one side of said rotation body with their optical axes being aligned, and attaching a shield plate or a mirror surface on said rotation body. In this configuration, when the rotation body is in said first posture, said shield plate or mirror surface enters into the gap between said pair of optical fibers, and when the rotation body is in said second posture, said shield plate or mirror surface comes out of the gap between said pair of optical fibers.

According to the present invention, a low voltage drive and a drive at a low current consumption are made possible thus providing an actuator device which excels in durability and can provide a stable reproducibility even for a long term drive.

DESCRIPTION OF THE EMBODIMENTS

Figure 1:
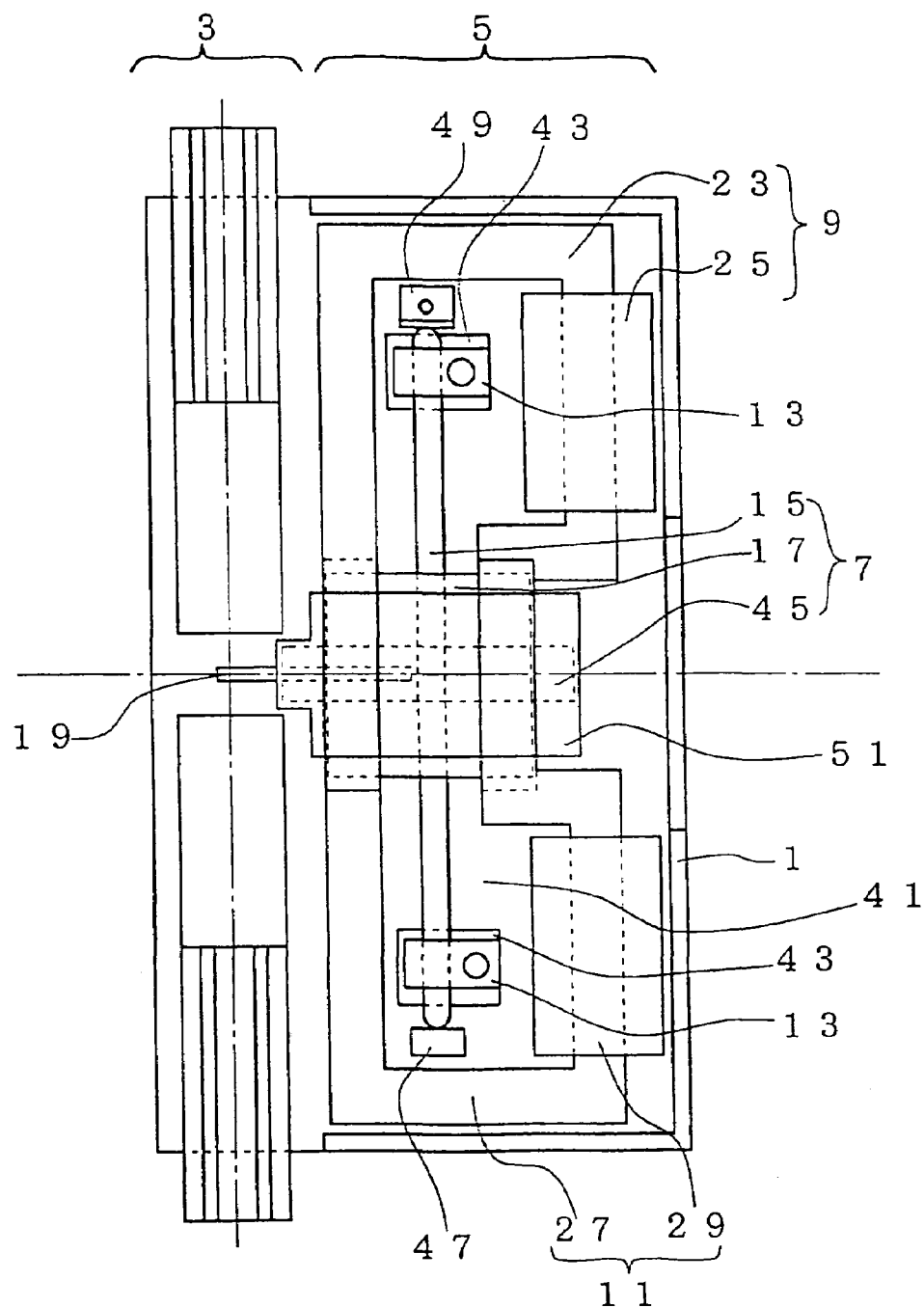
FIG. 1 is a plan view to show an example configuration in which the actuator device of the present invention is applied to an optical switch.

Hereinafter, the configuration of the actuator device according to one embodiment of the present invention will be described referring to the drawings. FIG. 1 is a plan view to show the case in which the actuator device of the present invention is applied to a mechanical optical switch. The like members of the prior art in the present drawings will be given the like numerals in the description.

EXAMPLE 1

The actuator device which is applicable to the mechanical optical switch of the present invention is configured such that an optical fiber part 3 is placed in the housing 1 of any size. This optical fiber part 3 has the same configuration as was explained relating to the prior art, and therefore the explanation herein will be omitted.

Moreover, the major parts of the actuator part 5 has also adopted the same configuration as has been explained relating to the prior art; the rotation body 7 comprises a rotation axis 15, a rotor magnet 17, and a mount part 45. The rotation axis 15 rests on a pair of rotation axis holding members 43 provided on the bottom face 41 of the housing 1 and is rotatably supported on the rotation axis holding member 43. The rotation axis 15 resting on the rotation axis holding member 43 is pressed from above by an axis pressing spring 13 which is placed on each of the rotation axis holding members 43 respectively. Further, one end of the rotation axis 15 is supported by a block 47, and the other end by a thrust spring 49. These axis pressing spring 13, block 47, and thrust spring 49 are fixed to the housing 1. A rotation restriction plate 51 is attached to the housing 1 at a position opposite the rotation holding member 43 with respect to the rotation axis 15.

Moreover, the actuator device of the present invention may perform various switching functions by rotating the rotation body 7. Specifically, the rotation body 7 can function as a switch by placing a shield plate 19 on the rotation body 7 itself or a driven body which rotates together with the rotation body 7 and rotating the rotation body 7 between the first rotation position and the second rotation position. Furthermore, the actuator device of the present invention may be provided, other than the shield plate 19, with a reflection mirror, a sensor, and the like which are not shown in the figure. It is also possible to provide this sensor separately from the rotation body 7 or the driven body, instead of placing them on the rotation body 7 or on the driven body.

In the above description, a configuration in which the actuator of the present invention is applied to an optical switch is shown as an example, the actuator device of the present invention is a technique which can be applied, without being limited to this area of optical switches, to all the switching mechanisms for which the reproducibility of switching function, durability of the device, compactness, low power consumption and the like are required.

Figure 2A:
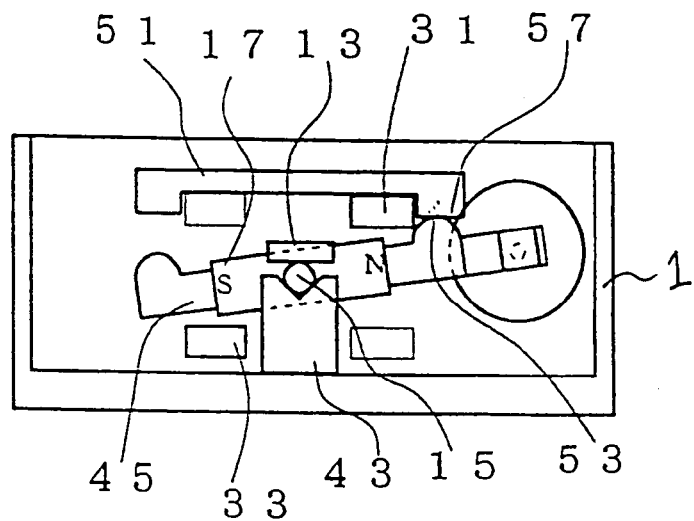
FIG. 2A is a sectional view to show the state in which the rotation body of the actuator device of FIG. 1 is in the first rotation position.
Figure 2B:
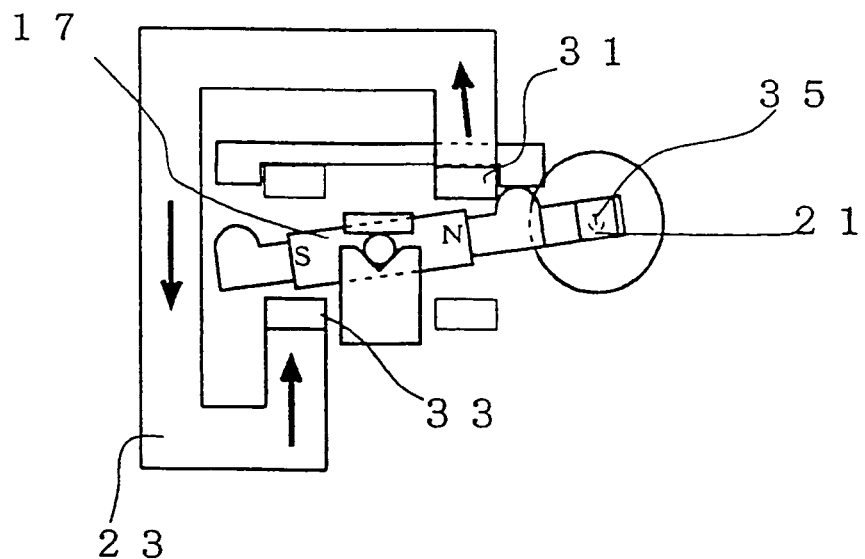
FIG. 2B is a magnetic circuit diagram to show that the rotation body is self-held in that state.

The structure by which the rotation body 7 of the actuator device shown in FIG. 1 holds the first rotation position will be described referring to FIG. 2A and FIG. 2B. FIG. 2A is a sectional view when the rotation body 7 including the rotor magnet 17 is at the first rotation position. FIG. 2B is an explanatory diagram to show the flow of magnetic flux in a state in which the rotation body 7 holds its first rotation position. In this case, it is supposed that the rotor magnet 17 is polarized in two poles in the direction shown in FIGS. 2A and 2B.

One end 31 of the first yoke is located near the N pole of the rotor magnet 17 as shown in FIG. 2A, and the other end 33 is located near the S pole of the rotor magnet 17. The rotation axis 15 rests on the upper end face of the rotation axis holding member 43 and is rotatably supported on the rotation axis holding member 43 by being pressed from above by an axis pressing spring 13. Specifically, the top face of the rotation axis holding member 43, which is provided on the bottom part of the housing 1, is formed with a recess such as a V-shape groove opening upward, and the rotation axis 15 rests on the recess thereby being rotatably supported on the rotation axis holding member 43. Moreover, this rotation axis 15 is pressed by an axis pressing spring 13 from above thereby being prevented from coming out upwardly from the recess of the rotation axis holding member 43.

Figure 13A:
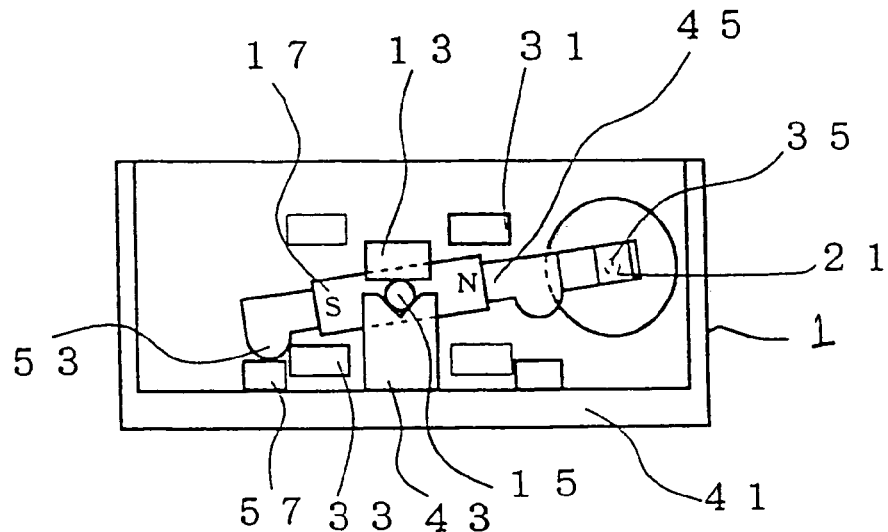
FIG. 13A is a sectional view to show the state in which the rotation body is in the first rotation position in the actuator device of FIG. 11.
Figure 13B:
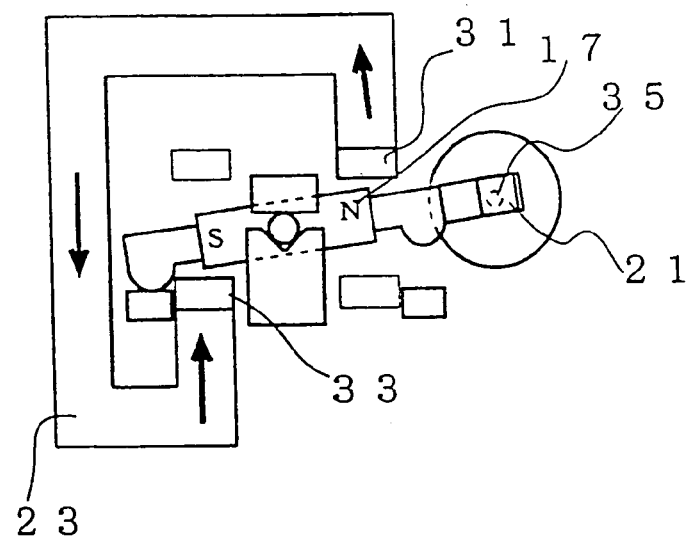
FIG. 13B is magnetic circuit diagram to show the configuration in which the rotation body is self-held at the first rotation position.

The first abutment part 53 of the mount part 45 constituting the rotation body 7 comes into contact with the first rotation restriction part 57 of the rotation restriction plate 51 and magnetic flux flows as shown in FIG. 2B, which allows the rotation body 7 to be held at the first rotation position. The explanation of the holding of the rotation position of the rotation body 7 by such flow of magnetic flux is the same as previously explained referring to FIG. 13B, and therefore will be omitted.

Figure 3A:
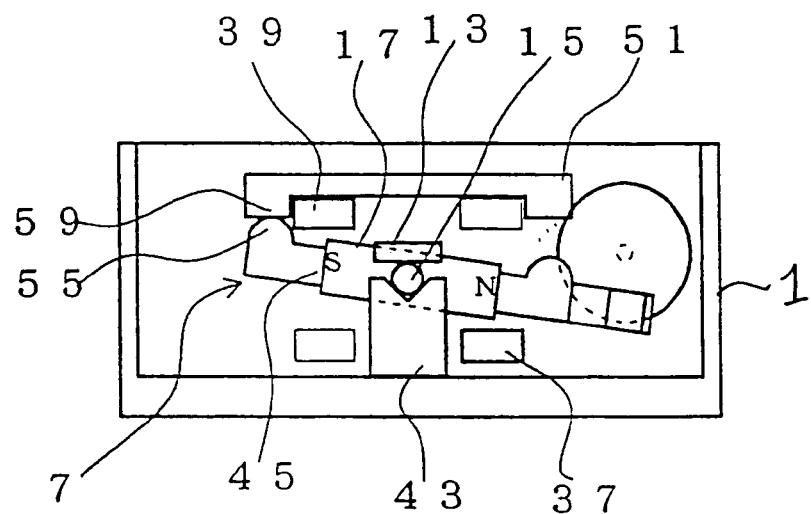
FIG. 3A is a sectional view to show the state in which the rotation body of the actuator device of FIG. 1 is in the second rotation position.

Next, the structure with which the rotation body 7 holds its rotation position will be described referring to FIGS. 3A and 3B. FIG. 3A is a sectional view in a case in which the rotation body 7 including the rotor magnet 7 is at the second rotation position. Also FIG. 3B is an explanatory diagram to show the flow of magnetic flux in a state in which the rotating body 7 holds its second rotation position.

Figure 3B:
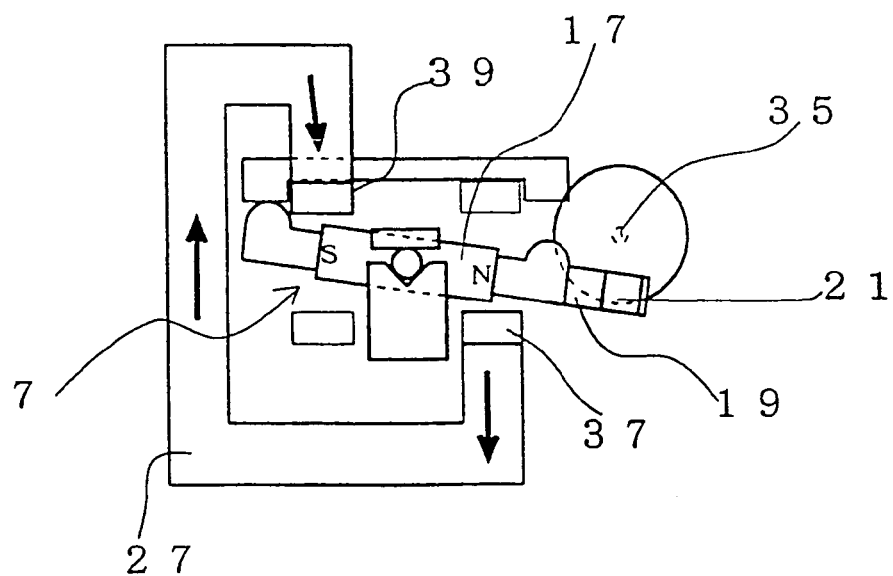
FIG. 3B is a magnetic circuit diagram to show that the rotation body is self-held in that state.
Figure 14A:
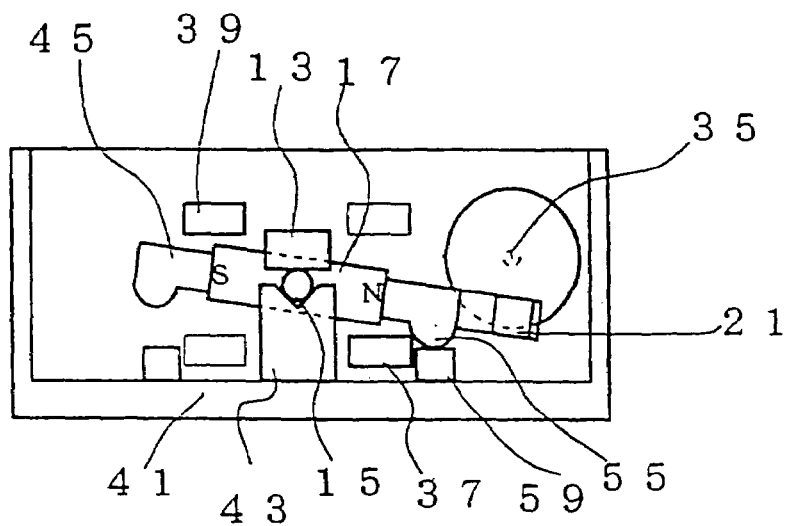
FIG. 14A is a sectional view to show the state in which the rotation body is at the second rotation position in the actuator device in FIG. 11.
Figure 14B:
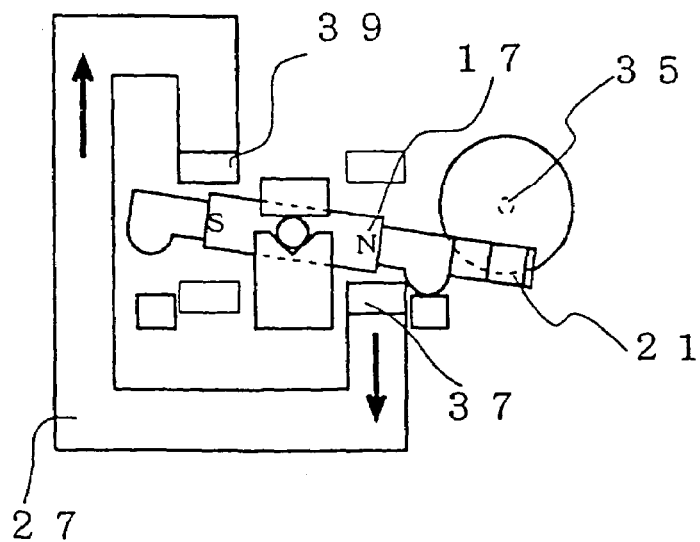
FIG. 14B is a magnetic circuit diagram to show the configuration in which the rotation body is self-held at the second rotation position.
Figure 15A:
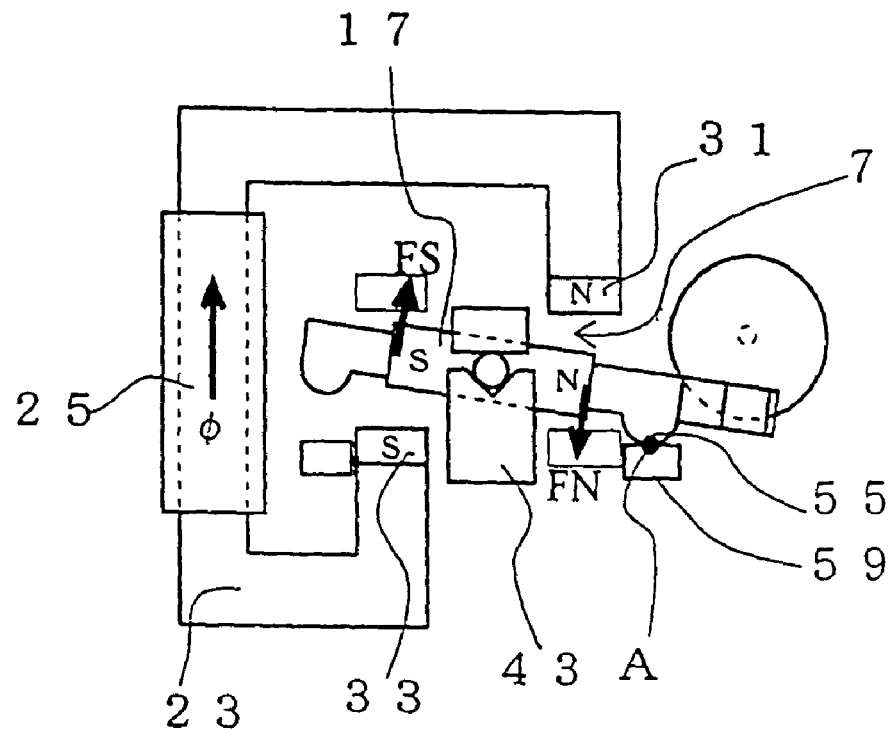
FIG. 15A is an explanatory diagram to show the force acting on the rotation body when the rotation body of the actuator device of FIG. 11 has been driven from the second rotation position to the first rotation position.
Figure 15B:
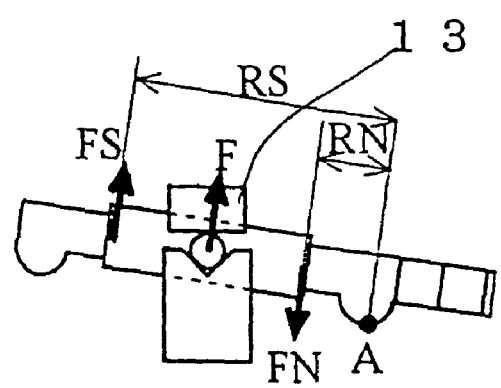
FIG. 15B is an explanatory diagram to show the force acting on the rotation axis of the rotation body at that time.
Figure 16A:
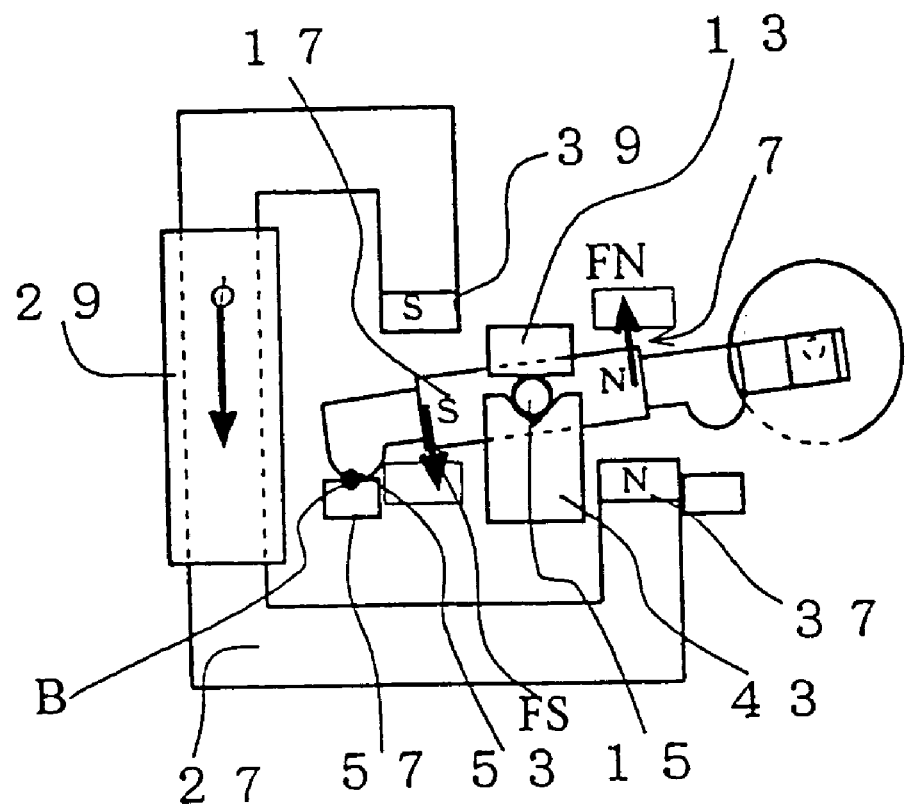
FIG. 16A is an explanatory diagram to show the force acting on the rotation body when the rotation body of the actuator device of FIG. 11 has been driven from the first rotation position to the second rotation position.
Figure 16B:
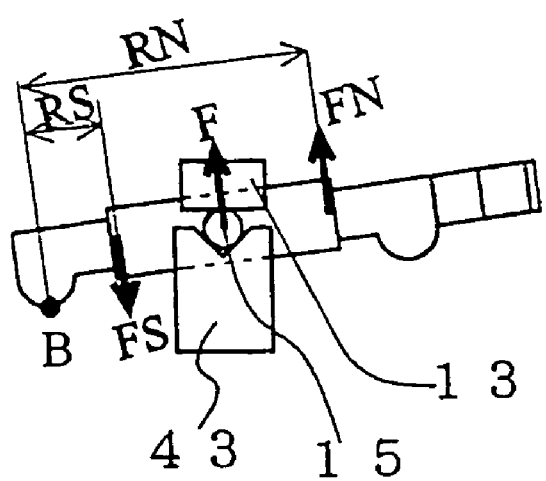
FIG. 16B is an explanatory diagram to show the force acting on the rotation axis of the rotation body at that time.

The second abutment part 55 of the mount part 45 comes into contact with the second rotation restriction part 59 of the rotation restriction plate 51 and the magnetic flux flows as shown in FIG. 3B, thereby the rotation body 7 being held at the second rotation position. The explanation on the holding of the rotation position of the rotation body 7 by such flow of magnetic flux is the same as has been explained before referring to FIG. 14B, and therefore will be omitted.

Now, the force acting on the rotation body 7 when the rotation body 7 is moved from the first rotation position to the second rotation position will be explained referring to FIGS. 4A and 4B.

When the rotation body 7 is held at the first rotation position as shown in FIG. 2A, the first exciting coil 25 wound around the first yoke 23 is applied a current to generate a magnetic flux φ, and thereby one end 31 of the first yoke 23 is polarized into N pole and the other end 33 into S pole. Then, a repulsive force FN is generated between the N pole of one end 31 of the first yoke 23 and the N pole of the rotor magnet 17. At the same time, a repulsive force FS is generated between the S pole of the other end 33 of the first yoke 23 and the S pole of the rotor magnet 17. These repulsive forces FS and FN will cause the rotation body 7 including the rotor magnet 17 to rotate about the rotation axis 15 in the clockwise direction, thereby moving the rotation body 7 from the first rotation position to the second rotation position as shown in FIG. 4A.

This rotation of the rotation body 7 in the clockwise direction will be restricted by the abutment of the second abutment part 55 of the mount part 45 constituting the rotation body 7 against the second rotation restriction part 59 of the rotation restriction plate 51. When the second abutment part 55 of the mount part 45 abuts against the second rotation restriction part 59, the rotation body 7 is subjected to a moment pivoted at the contact point A acting as a supporting point, as shown in FIG. 4B.

Figure 4A:
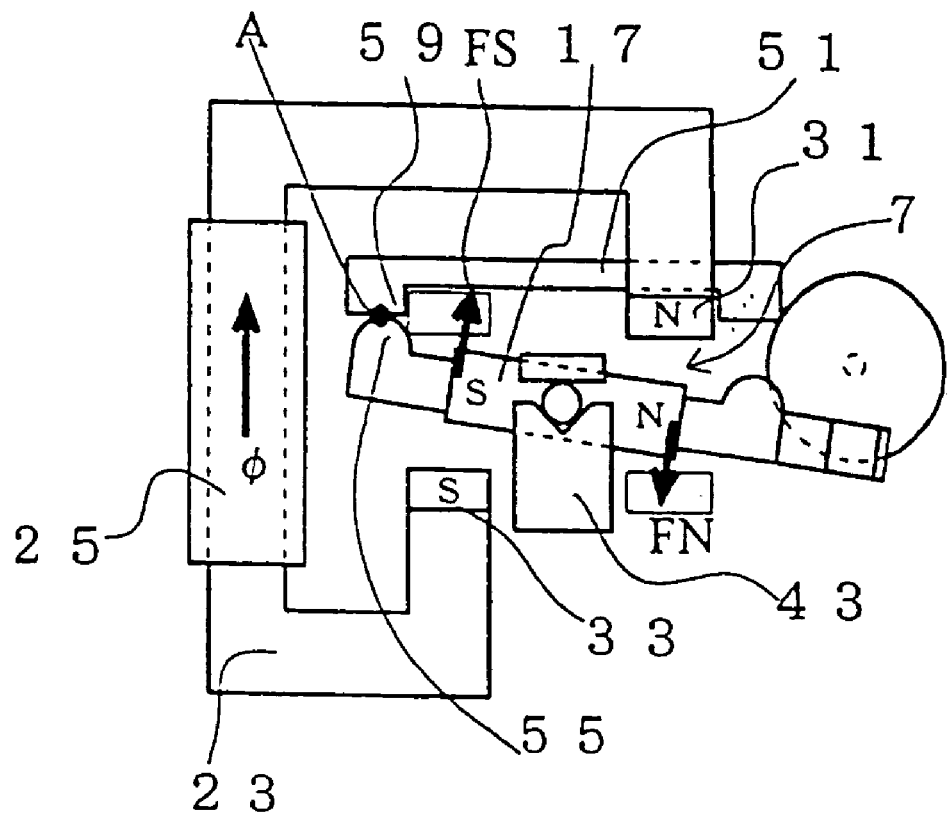
FIG. 4A is an explanatory drawing to show the force acting on the rotation body when the rotation body of the actuator device of FIG. 1 is driven from the second rotation position to the first rotation position.
Figure 4B:
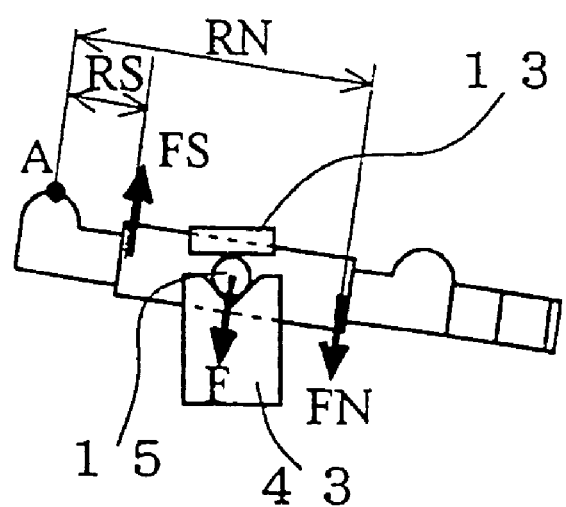
FIG. 4B is an explanatory drawing to show the force which acts on the rotation axis of the rotation body at that time.

To explain the moment thus generated referring to FIG. 4B, now letting that the distance from the contact part A to the point at which the repulsive force FS acts be RS, and the distance to the point at which the repulsive force FN acts be RN, the torque T acting on the center of gravity of the rotation body 7 is given by the following equation where the clockwise direction is supposed to be the plus direction.

$$T = FN \times RN - FS \times RS$$

Now, if FN=FS (=Fm), the following condition holds.

$$T = Fm(RN - RS) > 0$$

Thus, the rotation body 7 is subjected to a moment in clockwise direction at the contact part A acting as a supporting point. For this reason, the rotation axis 15 is exerted by a force Fin the direction shown in FIG. 4B, and therefore the rotation axis 15 is pressed in the direction of the rotation axis holding member 43, and thus the rotation body 7 including the mount part 45 will not be floated up from the rotation axis holding member 43 when the second abutment part 55 of the mount part 45 abuts against the second rotation restriction part 59.

Figure 5A:
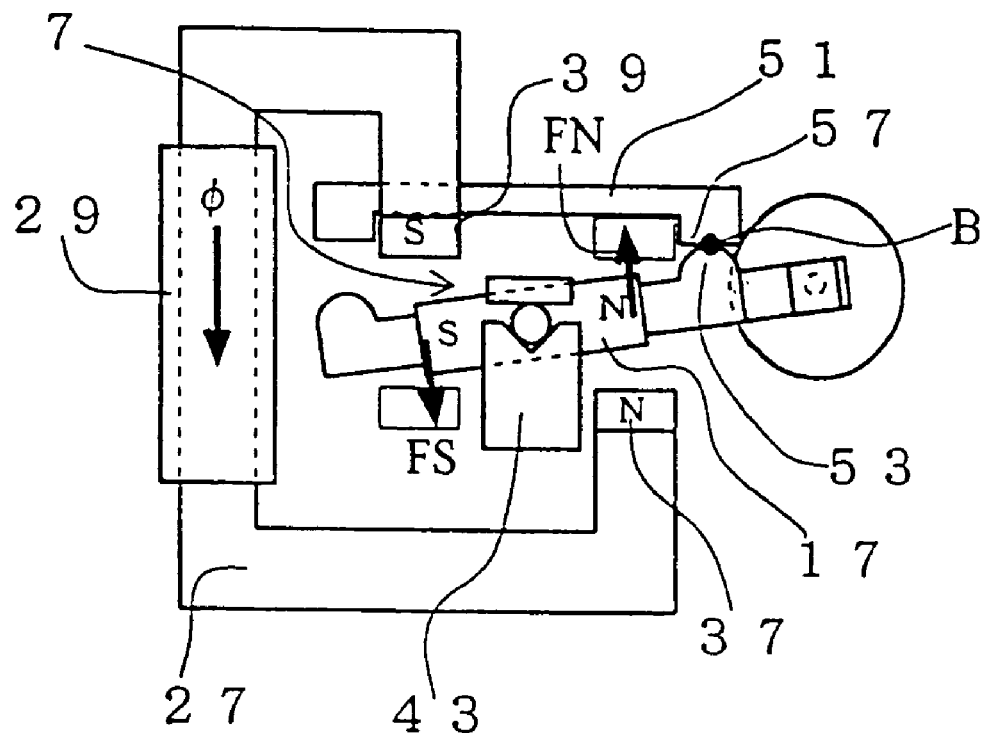
FIG. 5A is an explanatory drawing to show the force acting on the rotation body when the rotation body of the actuator device of FIG. 1 is driven from the first position to the second position.

Next, the force which acts on the rotation body 7 when the rotation body 7 moves from the second rotation position to the first rotation position as shown in FIG. 4A, will be described referring to FIG. 5A and FIG. 5B.

When the rotation body 7 is held at the second rotation position as shown in FIG. 3A, the second exciting coil 29 wound around the second yoke 27 is applied a current to generate a magnetic flux φ, and thereby one end 37 of the second yoke 27 is polarized into N pole and the other end 39 into S pole. Then, a repulsive force FN is generated between the N pole of one end 37 of the second yoke 27 and the N pole of the rotor magnet 17. At the same time, a repulsive force FS is generated between the S pole of the other end 39 of the second yoke 27 and the S pole of the rotor magnet 17. These repulsive forces FS and FN will cause the rotation body 7 including the rotor magnet 17 to rotate about the rotation axis 15 in the counter-clockwise direction, thereby moving the rotation body 7 from the second rotation position to the first rotation position as shown in FIG. 5A.

This rotation of the rotation body 7 in the counter-clockwise direction will be restricted by the abutment of the first abutment part 53 of the mount part 45 constituting the rotation body 7 against the first rotation restriction part 57 of the rotation restriction plate 51. When the first abutment part 55 of the mount part 45 abuts against the first rotation restriction part 57, the rotation body 7 will be subjected to a moment pivoted at the contact point B acting as a supporting point, as shown in FIG. 5B.

Figure 5B:
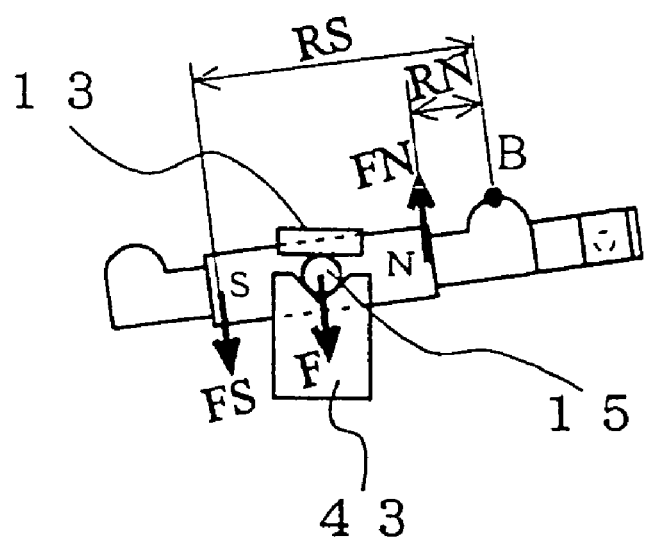
FIG. 5B is an explanatory drawing to show the force acting on the rotation axis of the rotation body at that moment.

To explain the moment thus generated referring to FIG. 5B, now letting that the distance from the contact part B to the point at which the repulsive force FS acts be RS, and the distance to the point at which the repulsive force FN acts be RN, the torque T acting on the center of gravity of the rotation body 7 is given by the following equation where the clockwise direction is supposed to be the plus direction.

$$T = FS \times RS - FN \times RN$$

Now, if FS=FN (=Fm), the following condition holds.

$$T = Fm(RS - RN) > 0$$

Thus, the rotation body 7 is subjected to a moment in counter-clockwise direction pivoted at the contact part B acting as a supporting point. For this reason, the rotation axis 15 is exerted by a force F in the direction shown in FIG. 5B, and therefore the rotation axis 15 is pressed in the direction of the rotation axis holding member 43, and thus the rotation body 7 including the mount part 45 will not be floated up from the rotation axis holding member 43 when the first abutment part 53 of the mount part 45 abuts against the first rotation restriction part 57.

As so far explained, the present invention is arranged such that the rotation restriction plate 51 is placed on the side opposite the rotation axis holding member 43 with respect to the rotation axis of the rotation body 7 so that the rotation axis 15 will be subjected to a force in the direction to be pressed against the rotation axis holding member 43 bearing thereof when one end 53 or the other end 55 of the rotation body 7 is made to abut against one end (the first rotation restriction part 57) or the other end (the second rotation restriction part 59) of the rotation restriction plate 51 (that is, when the rotation body 7 is rotated up to the first or second rotation position).

By the way, the actuator device of the present invention is applied to an optical switch as shown in FIG. 1. That is, a pair of optical fibers are oppositely placed on one side of the rotation body 7 with their optical axes being aligned, and further the rotation body 7 is attached with a shield plate 19 or a reflecting mirror 21. And, arrangement is made such that when the rotation body 7 is at the first rotation position, the shield plate 19 or the reflecting mirror 21 enters into the gap between the pair of optical fibers and, when the rotation body 7 is at the second rotation position, the shield plate 19 or the reflecting mirror surface 21 comes out of the gap between the pair of optical fibers.

In this actuator device as an optical switch, both when the rotation body 7 is moved from the second rotation position to the first rotation position to make one end 53 of the rotation body 7 abut against one end 57 of the rotation restriction plate 51, and when it is moved from the second rotation position to the first rotation position to make the other end 55 of the rotation body 7 abut against the other end 59 of the rotation restriction plate 51, since the rotation axis 15 will not be subjected to a force to detach it from the rotation axis holding member 43, with the result that there will be no deflection in moving operation of the shield plate 19 or the reflecting mirror surface 21 which comes in and out of the gap between a pair of optical fibers.

Next, the drive method of the rotation body 7 which constitutes the actuator device of the present invention will be described referring to FIG. 6A and FIG. 6B.

Figure 6A:
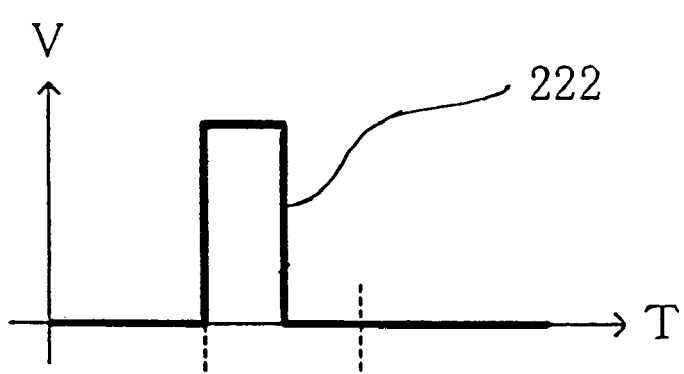
FIGS. 6A and 6B are explanatory drawings to show the drive method of the rotation body in the actuator device of FIG. 1.
Figure 6B:
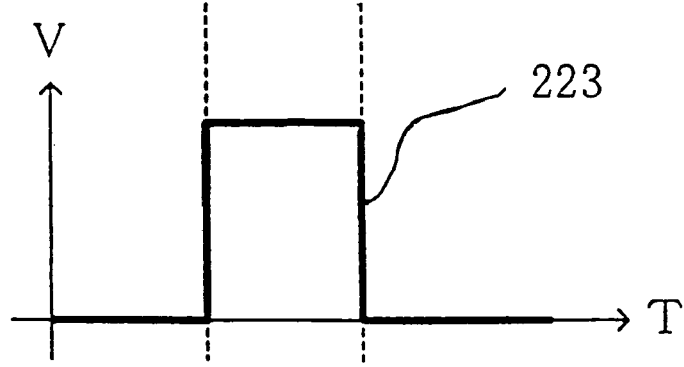

The drive waveform shown in FIG. 6A is a diagram to explain the first and third drive methods of the rotation body 7, and the drive waveform shown in FIG. 6B is a diagram to explain the second and fourth drive methods of the rotation body 7. In these diagrams, the ordinate represents a voltage axis, and the abscissa represents a time axis.

In the first drive method of the rotating body 7, at some point in time, either one of the first and second exciting coils 25, 29 wound around the first and second yokes 23, 27 is applied a current of a drive waveform 222 such as shown in FIG. 6A to drive the rotation body 7. This drive current has a pulse width necessary for driving the rotation body 7.

In the second drive method of the rotating body 7, at some point in time, either one of the first and second exciting coils 25, 29 wound around the first and second yokes 23, 27 is applied a current of a drive waveform 223, which has a larger pulse width than that of FIG. 6A, to drive the rotation body 7. Increasing the pulse width in this way will cause the current to flow in the exciting coil for a longer time, and thereby the magnetic attraction force will act on the rotor magnet 17 of the rotation body 7 for a longer time. Thereby, the rotation body 7 is reliably driven.

In the third drive method of the rotating body 7, at some point in time, both of the first and second exciting coils 25, 29 wound around the first and second yokes 23, 27 are applied a current to excite the both exciting coils 25, 29 at the same time thus driving the rotation body 7. The pulse width of this driving current is set to be same as that of the drive current in the first drive method (FIG. 6A).

Since adopting this third drive method will cause the rotor magnet 17 of the rotation body 7 to be subjected to a magnetic attraction force and a magnetic repulsive force at the same time, it is made possible to drive the rotation body 7 more reliably than in the first and second drive methods.

Further, in the fourth drive method of the rotation body 7, at some point in time, both of the first and second exciting coils 25, 29 wound around the first and second yokes 23, 27 are applied a current to excite both exciting coils 25, 29 at the same time to drive the rotation body 7. The pulse width of this drive current is set to be same as that of the drive current in the second drive method (FIG. 6B).

Now, specific drive method of the rotation body 7 will be described in more detail.

For driving the rotation body 7, generally the above described first drive method is applied in which the power consumption is least. However, there is possibility that the rotation body 7 can not be driven by the first drive method due to the causes relating to the outside environment of the actuator device such as a sudden change in temperature.

Then, when the first drive method can not be used, it may be effective in some cases to drive the rotation body 7 by immediately switching the drive method automatically to either one of the second, third, fourth method, or a combination thereof. The function of automatically switching the drive method will be described below.

Namely the force acting on the magnet of the rotation body 7 becomes larger in the second drive method than in the first, in the third than in the second drive method, and in the fourth than in the third drive method in that order. Thus, by selecting these drive methods depending on the application, it will be possible to drive the rotation body 7 in any environment. However, adopting a drive method which requires an excessive load causes a large amount of unnecessary current flow resulting in a large power consumption. Then, adopting a function of automatically switching drive methods will enable to minimize this problem thereby making the drive of the rotation body 7 more reliable. Thus, it will be understood that a drive method based on the switching of multiple drive methods will be an effective way to ensure the operation of the rotation body 7.

Moreover, for the cases in which the rotation body 7 has not been driven, it is desirable to try to drive the rotation body 7 by executing each drive method successively. However, as so far has been described, since each drive method will cause to increase the current flowing time, and also energizing two exciting coils will increase power consumption, it will be necessary, in such cases, to consider the drive method, the combination of the drive methods, or the number for combination depending on the uses and specifications of the actuator device.

Having considered the above matters, it will be understood that to reliably drive the actuator device of the present invention at a low power consumption and in a short time, it is desirable to drive by the first method under normal conditions, and when the actuator device can not be driven by the first drive method, it is desirable to use the third or fourth drive method as the next drive method.

Next, a drive method for preventing the adhesion of the slide parts of the rotation axis 15 and the rotation axis holding member 43 will be described referring to FIGS. 7A and 7B.

When the contact part of the rotation axis 15 and the rotation axis holding member 43 (hereinafter, the contact part is referred as a slide part) is left undriven for a long time, a phenomenon may occur in which movement of the rotation body 7 from the first rotation position to the second rotation position, or from the first rotation position to the second rotation position is hindered. With this being the situation, to avoid such adhesion of the slide parts, arrangement is made to drive the slide part at a minute level by means of a periodic feeble pulse.

As described so far, when the signal for driving the rotation body 7 has not been inputted to the actuator device for a long period of time, adhesion may occur in the slide part. In such cases, a signal waveform 214 of an instant, weak short pulse as shown in FIG. 7 is applied to either one or both of the first and second exciting coils 25, 27. The ordinate in FIG. 7A represents a voltage axis and the abscissa represents a time axis. Moreover, the pulse width applied herein will be sufficient if it will change the rotation holding position of the rotation body 7 by a minute angle.

Figure 7A:
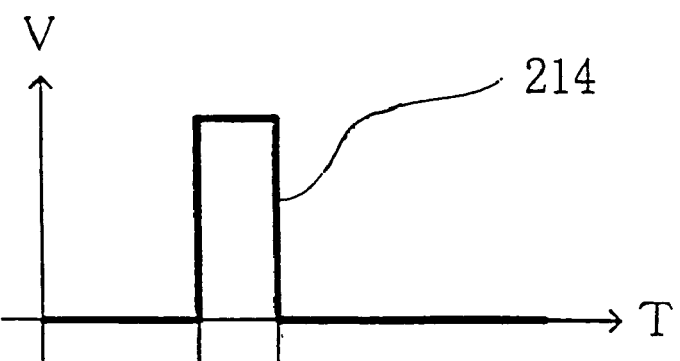
FIGS. 7A and 7B are explanatory drawings to show the means for preventing the adhesion of the rotation axis to the rotation axis holding member in the actuator device of FIG. 1.
Figure 7B:
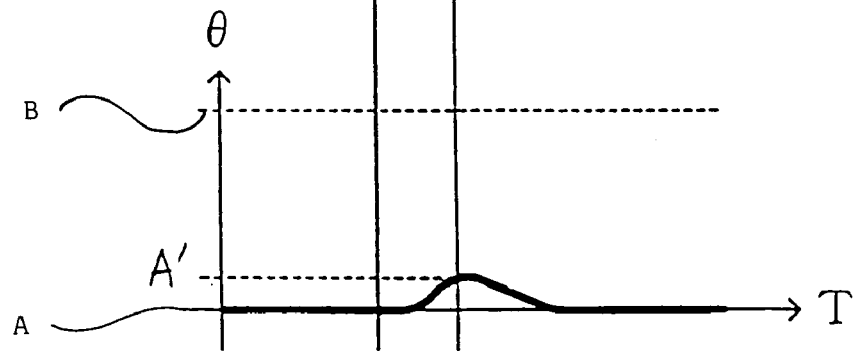

FIG. 7B is an explanatory diagram to show the adhesion prevention function in which the ordinate represents a rotation angle axis (θ) of the rotation axis and the abscissa represents a time axis. The rotation holding positions A and B in the figure represent the angle θ of the rotation axis 15 while the rotation body 7 is held in one position or in the other position respectively for a long time.

FIGS. 7A and 7B show that when a feeble pulse waveform 214 shown in FIG. 7A is applied to the exciting coil, the rotation body 7 will be moved by a small angle A' from the rotation holding position A toward the rotation holding position B.

Thus, applying an instant, feeble, short pulse waveform to the exciting coil at a certain constant period as shown in FIG. 7A enables to prevent potential adhesion of the slide part.

EXAMPLE 2

To operate the actuator device of the present invention as an optical switch or in other uses, it is necessary to add a control circuit and perform its switching operation. Generally, a configuration in which a control device having a driving circuit part and a control circuit part is placed outside of the actuator device is typical. However, in this example, since the rotation restriction plate 51 is provided inside the device, it is possible to place the driving circuit on the rotation restriction plate 51. Such an example of configuration will be described in more detail below referring to FIG. 8.

Figure 8:
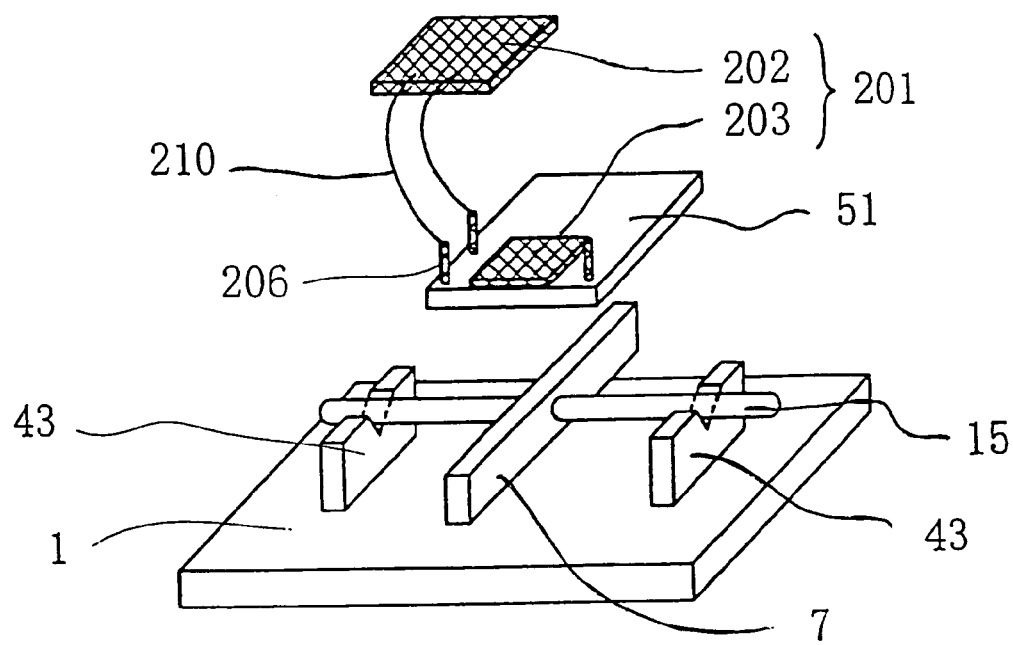
FIG. 8 is a perspective view to show a configuration in which a driving circuit is provided on the rotation restriction plate in the actuator device of FIG. 1.

FIG. 8 is a perspective view to show the configuration example in which a driving circuit part 203 is placed on the rotation restriction plate 51 constituting the actuator device of the present invention.

To drive the actuator device, a control circuit part 202 for outputting a trigger signal to operate the device, and a drive circuit part 203 which receives the trigger signal from the control circuit part 202 and outputs a current to the first and second exciting coils (not shown) in the actuator device to drive the rotation body 7 are required. Moreover, the present device is configured to have a terminal pin 206 which is connected to the drive circuit part 203 and through which the device is connected to the wiring outside the device, and is connected to the control circuit part 202 by a signal line 210 via the terminal pin 206.

The above described configuration of the actuator device of the present invention makes it possible to decrease the device size, reduce the number of parts, and enhance its convenience.

Thus, disposing the driving circuit part 203 on the rotation restriction plate 51 and housing this driving circuit part 203 inside the actuator device makes it possible to directly perform the connection of the first and second exciting coils 205, 209, which are not shown here, and the driving circuit part 203 inside the actuator device. For this reason, it is possible to eliminate the need of arranging a terminal pin for excitation, which was a necessary configuration for an actuator device having a control device in its outside, outside the housing 1, thereby allowing the reduction of the number of parts. Moreover, this configuration improves the workability in assembly. Furthermore, since the area for placing the terminal pin for excitation becomes unnecessary, the size of the actuator device can be reduced.

Moreover, according to the present configuration, it is possible to perform the control of the actuator device at a low power consumption because only the voltage control of the trigger signal is conducted by the control circuit part 202 for the actuator device outside the device. Further, for the cases in which a large number of actuators are placed side by side to control them, it is effective to drive the actuator device at a low power consumption.

EXAMPLE 3

Next, an example of other uses of the rotation restriction plate 51 described in the example 1 will be described, and a configuration in which a position detection component for detecting the position of the rotation body 7 is disposed on the rotation restriction plate 51 will be also described. Further, a configuration in which the actuator device of the present example is provided with such a position detection component will be described in detail referring to FIG. 9.

In the present example, a photo-interrupter 207 is used as the position detection component. A photo-interrupter is a device in which two elements, a light emitting element and a light receiving element, are disposed at opposite positions and packaged, and it outputs the existence of a light obstructing object between the two elements by a binary code.

Figure 9:
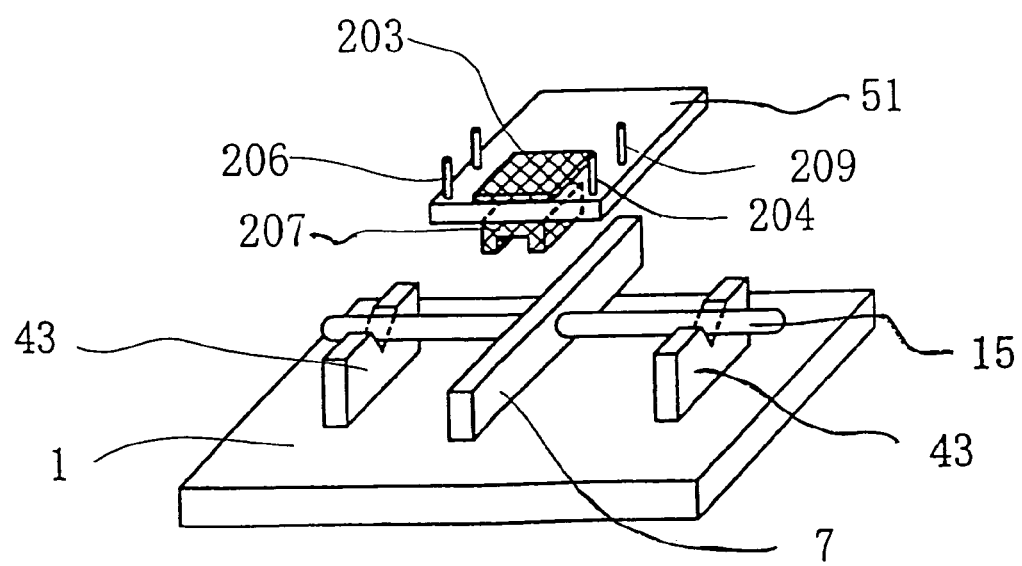
FIG. 9 is a perspective view to show a configuration in which a driving circuit and a position detection component are provided on the rotation restriction plate in the actuator device of FIG. 1.

The photo-interrupter is placed on the rotation restriction plate 51 as shown in FIG. 9 and the movement of the rotation body 7 (the first rotation position and second rotation position as described relating to example 1) can be detected from the insertion/removal of the rotation body 7 into/from the two elements constituting the photo-interrupter 207. The binary signals outputted from the photo-interrupter 207 are directly inputted to the drive circuit part 203. Reference numeral 204 shown in this figure represents a terminal pin for detecting the positional signal of the rotation body 7, and reference numeral 209 represents a terminal for power supply. Furthermore, the same effect as that of the present embodiment will be obtained by using a photo-reflector or a magnetic sensor as the position detection component.

Thus, in the actuator device of the present example, since the photo-interrupter 207 is placed in the back side of the rotation restriction plate 51 on which the drive circuit part 203 is placed, a direct connection between the photo-interrupter 207 and the driving circuit part 203 is made possible. Further, even when the photo-interrupter 207 has failed for any reason, the placement on the rotation restriction plate 51 would have an advantage in that the detachment or replacement can be done more quickly.

In the above described configuration, a photo-interrupter 207 is disposed along with the drive circuit part 203; however, as a matter of course, it is also possible to configure that only the photo-interrupter 207 is disposed inside the actuator device and the drive circuit part 203 is disposed outside the actuator device.

EXAMPLE 4

Figure 10:
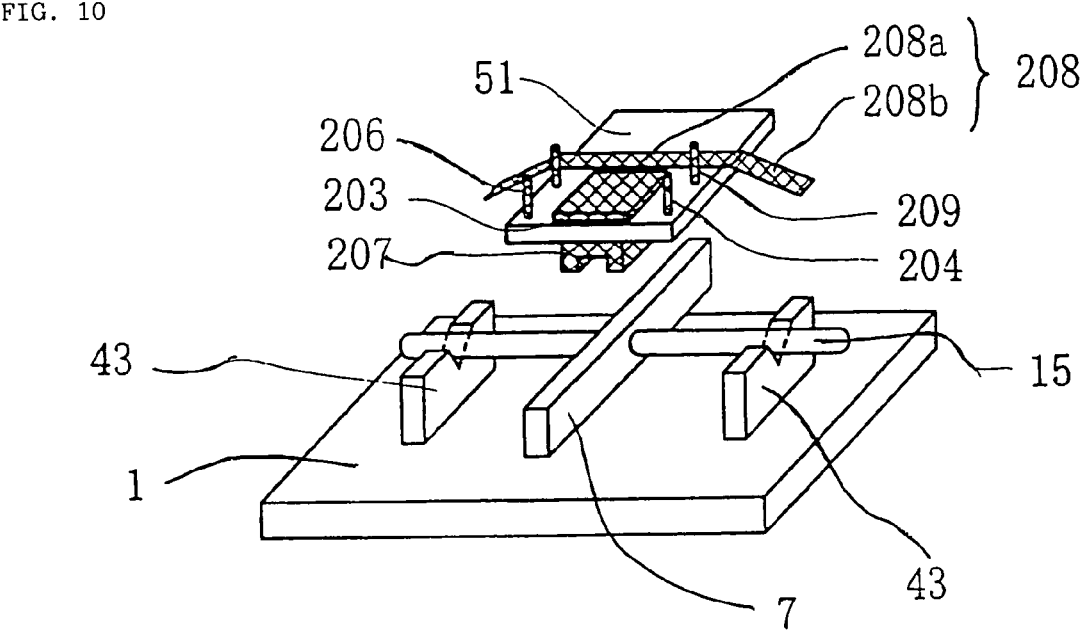
FIG. 10 is a perspective view to show the mounting of an axis pressing spring, which is integrated with a drive circuit and a position detection component, on the rotation restriction plate in the actuator device of FIG. 1.
Figure 11:
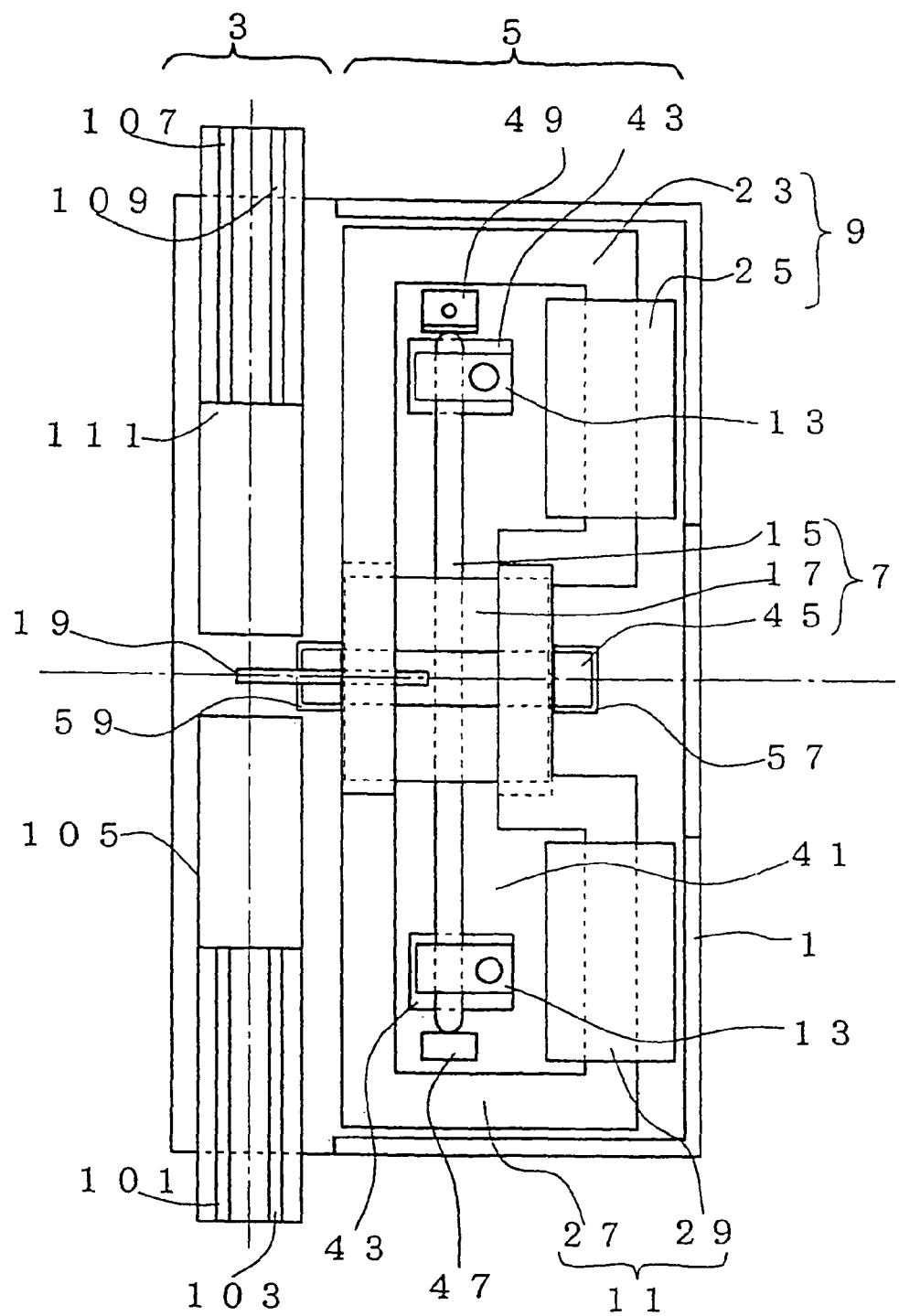
FIG. 11 is a plan view to show a configuration example in which a prior art actuator device is applied to an optical switch.
Figure 12:
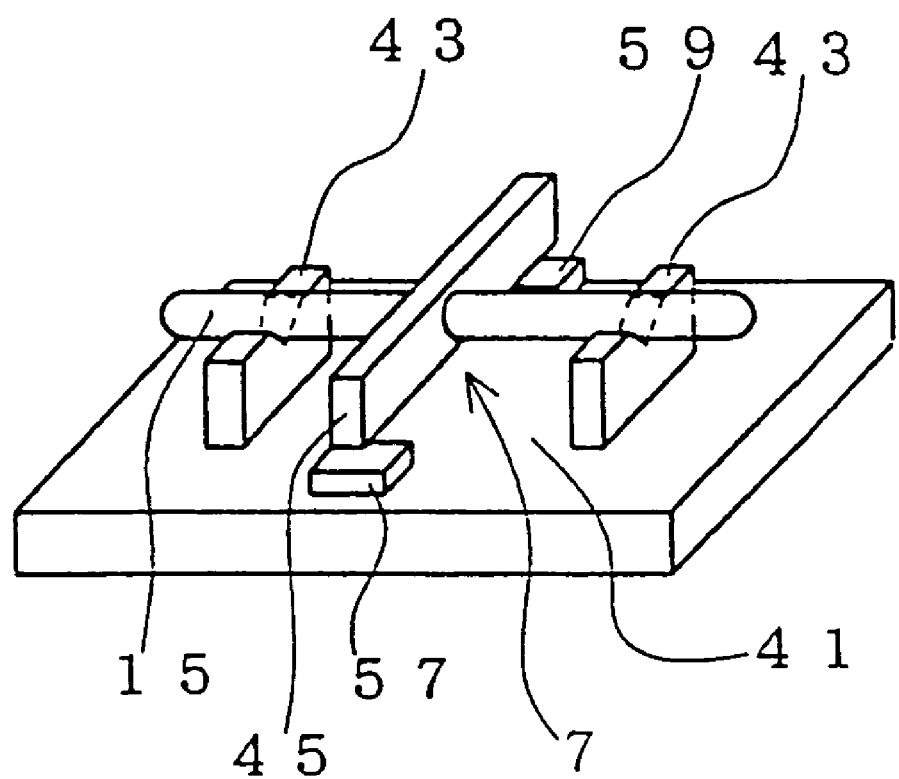
FIG. 12 is a perspective view to show the configuration of the rotation body in the actuator device of FIG. 11.

An example in which an axis pressing spring for pressing the rotation axis 15 resting on the rotation axis holding member 43 from above is integrally structured with the rotation restriction plate 51 for the purpose of reducing the number of parts and enhancing of assembly work will be described referring to FIG. 10.

The axis pressing spring 208 consists of a fixing part 208a in the middle and spring parts 208b on right and left sides thereof. The fixing part 208a is fixed to the rotation restriction plate 51 with fixing means (not shown) such as a screw, with the tips of the left side and right side spring parts 208b being a free end. When fixing the rotation restriction plate 51 on which the axis pressing spring 208 is fixed to the housing 1, the spring part 208b of the axis pressing spring 208 is located right above the rotation axis holding member 43 and press the rotation axis 15, which is placed on the rotation axis holding member 43, from above.

Thus, providing the axis pressing spring 208 on the rotation restriction plate 51, the number of parts can be reduced and the fixation of the fixing part 208a of the axis pressing spring 208 on the rotation restriction plate 51 is made possible. Thus, even when the size of the spring is small, fixation by screw can be easily done on the rotation restriction plate 51 thereby enhancing the workability of assembly.

Moreover, as a method to reduce the number of parts and enhance the workability of assembly operation, an integrated axis pressing spring 208 may be integrally formed with the rotation restricting means 51 by means of an insert molding.

Furthermore, arrangement may be made such that the axis pressing spring 208 and the photo-interrupter 207 are disposed on the rotation restriction plate 51, and the drive circuit part 203 is disposed outside the actuator device or, as a matter of course, arrangement may be such that the photo-interrupter 207 is disposed on the housing 1, which was described in FIG. 8, and only the axis pressing spring 208 is disposed on the rotation restriction plate 51.

According to the actuator device, since it is configured such that the force which acts on the rotation body when the rotation body is driven is always directed toward the rotation axis holding member, it is possible to achieve a structure with which axial vibration and rise of the rotation axis from the rotation axis holding member, or the deviation of the rotation axis are prevented thereby achieving a stable operation.

Therefore, according to the configuration of the present invention, it is made possible to make the spring force of the axis pressing spring weaker than that in the conventional configurations, thereby reducing the friction force at the slide part of the rotation axis, and reducing the resistance load which hinders the rotation. Further, according to the present configuration, it made possible to achieve a low voltage drive, a low current consumption, and a rapid response, and to reduce the amount of wear at the slide parts thereby achieving stability of operational characteristics, continuous operation, stability of actions such as intermittent actions, excellent durability, and high reliability.

Furthermore, using the actuator device as the actuator for an optical switch makes it possible to achieve such advantages as that the positional change of the mirror is very small for a long period of time and also the change in the efficiency is very small, thereby providing a high reliability.

Furthermore, adding several kinds of functions to the drive circuit part makes it possible to drive the rotation body more reliably.

Furthermore, when the drive circuit part is placed on the rotation restriction plate inside the actuator device, since only the control of the voltage control of the trigger signal is conducted outside the actuator device, it is possible to reduce the number of terminal pins for the connection to the outside. Further, this configuration makes it possible to perform the control of the actuator device from the outside at a low power consumption. Furthermore, the driving of the actuator device at a low power consumption is particularly effective when a number of actuator devices are placed side by side to be controlled.

Furthermore, attaching a photo-interrupter and an axis pressing spring on the rotation restriction plate leads to reduction of the number of parts and improvement of the workability in assembly thereby allowing further reduction of the size of the device.

What is claimed is:

1. An actuator device comprising:
   a rotation body having a rotation axis,
   a rotation axis holding member which rotatably supports the rotation axis of said rotation body by bearing said rotation axis on a recess formed on its top face,
   a rotation restriction plate for restricting the rotation position of said rotation body,
   posture holding means for allowing a self-holding in a first posture in which one end of said rotation body is in abutment against one end of said rotation restriction plate, or in a second posture in which the other end of said rotation body is in abutment against the other end of said rotation restriction plate, and
   driving means for moving said rotation body from said first posture to said second posture, or from said second posture to said first posture,
   wherein said rotation restriction plate is provided on the side opposite said rotation axis holding member with respect to the rotation axis of said rotation body so that when one end or the other end of said rotation body is caused to abut against the one end or the other end of said rotation restriction plate, the rotation axis of the rotation body applies a force to the rotation holding member when an end of the rotation body is in contact with the restriction plate,
   wherein said posture holding means comprises a permanent magnet constituting part of the rotation body, and a first yoke and a second yoke extending from the vicinity of one end of the permanent magnet to the vicinity of the other end of said permanent magnet, and
   wherein when said rotation body is in said first posture or second posture, said rotation body is held in said first posture or second posture by forming a closed magnetic circuit between said permanent magnet and said first or second yoke.

2. The actuator device according to claim 1, wherein a driving circuit for operating said driving means is arranged on said rotation restriction plate.

3. The actuator device according to claim 1, wherein position detection means for detecting the position of said rotation body is arranged on said rotation restriction plate.

4. An actuator device comprising:
   a rotation body having a rotation axis,
   a rotation axis holding member which rotatably supports the rotation axis of said rotation body by bearing said rotation axis on a recess formed on its top face,
   a rotation restriction plate for restricting the rotation position of said rotation body,
   posture holding means for allowing a self-holding in a first posture in which one end of said rotation body is in abutment against one end of said rotation restriction plate, or in a second posture in which the other end of said rotation body is in abutment against the other end of said rotation restriction plate, and
   driving means for moving said rotation body from said first posture to said second posture, or from said second posture to said first posture,
   wherein said rotation restriction plate is provided on the side opposite said rotation axis holding member with respect to the rotation axis of said rotation body so that when one end or the other end of said rotation body is caused to abut against the one end or the other end of said rotation restriction plate, the rotation axis of the rotation body applies a force to the rotation holding member when an end of the rotation body is in contact with the restriction plate, and
   wherein an axis pressing spring for pressing said rotation axis supported by said rotation axis holding member against the rotation axis holding member is provided for said rotation axis.

5. The actuator device according to claim 4, wherein said axis pressing spring is arranged on said rotation restriction plate.

6. An actuator device comprising:
   a rotation body having a rotation axis,
   a rotation axis holding member which rotatably supports the rotation axis of said rotation body by bearing said rotation axis on a recess formed on its top face,
   a rotation restriction plate for restricting the rotation position of said rotation body,
   posture holding means for allowing a self-holding in a first posture in which one end of said rotation body is in abutment against one end of said rotation restriction plate, or in a second posture in which the other end of said rotation body is in abutment against the other end of said rotation restriction plate, and
   driving means for moving said rotation body from said first posture to said second posture, or from said second posture to said first posture,
   wherein said rotation restriction plate is provided on the side opposite said rotation axis holding member with respect to the rotation axis of said rotation body so that when one end or the other end of said rotation body is caused to abut against the one end or the other end of said rotation restriction plate, the rotation axis of the rotation body applies a force to the rotation holding member when an end of the rotation body is in contact with the restriction plate, wherein a pair of optical fibers are oppositely placed on one side of said rotation body with their optical axes being aligned, and said rotation body is attached with a shield plate or a mirror surface, and wherein an optical switch function is provided by configuring that when the rotation body is in said first posture, said shield plate or mirror surface enters into the gap between said pair of optical fibers, and when the rotation body is in said second posture, said shield plate or mirror surface comes out of the gap between said pair of optical fibers.

* * * * *